Figure 1:
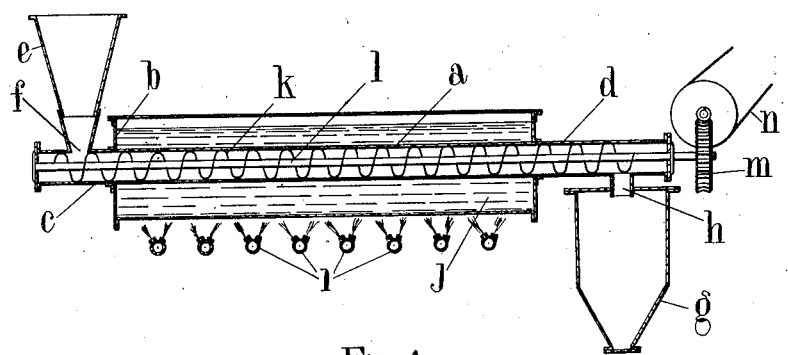

Sept. 3, 1929.  D. A. W. FAIRWEATHER ET AL  1,727,102
PRODUCTION OF BENZOIC ACID AND LIKE PROCESSES
Filed Nov. 16, 1928

D. A. W. Fairweather, E. G. Beckett
& J. Thomas
INVENTORS

By Marks & Clerk.

Patented Sept. 3, 1929.

1,727,102

UNITED STATES PATENT OFFICE.

DAVID ALEXANDER WHYTE FAIRWEATHER, ERNEST GEORGE BECKETT, AND JOHN THOMAS, OF GRANGEMOUTH, SCOTLAND, ASSIGNORS, BY MESNE ASSIGNMENTS, TO THE SELDEN COMPANY, OF PITTSBURGH, PENNSYLVANIA, A CORPORATION OF DELAWARE.

PRODUCTION OF BENZOIC ACID AND LIKE PROCESSES.

Application filed November 16, 1928, Serial No. 319,952, and in Great Britain September 29, 1927.

This invention relates principally to the production of benzoic acid from phthalic acid, but some parts thereof may be applied to like processes, for example, substituted benzoic acid from substituted phthalic acid, for instance, halogen phthalic acids.

It is well known that phthalic acid can be converted into benzoic acid by heating calcium phthalate with calcium hydroxide. This method is particularly useful when it is required to produce halogen free benzoic acid, because phthalic acid is easily obtained in a highly pure form free from halogens.

In investigating the manufacture of benzoic acid from the calcium salt of phthalic acid, we have found that the reaction proceeds smoothly at a temperature of about 440–450° C. If, however, an attempt is made to convert any considerable bulk of calcium phthalate into calcium benzoate at this temperature, there is a decided tendency for the reaction to get out of control as a considerable amount of heat is evolved during the conversion, and when this takes places the calcium benzoate formed is decomposed, giving degradation products such as benzene. Apparently the reaction is exothermic and this is liable to cause decomposition unless measures are taken to prevent the temperatures from becoming too high.

In carrying out the conversion on the large scale it is therefore desirable that only small quantities should be converted at the same time, and the operation is one which is therefore best carried through continuously, with only small quantities of material at any one time at or near the temperature of reaction.

The object of the present invention is to provide a process enabling benzoic acid to be produced continuously and on a large scale.

The invention consists in a method for the production of benzoic acid by heating together calcium phthalate and calcium hydroxide or like bodies according to which the temperature of the mass is limited, for example:—

(a) By conducting the mixture through a narrow heated tube so that the bulk of the mixture which has arrived at reaction temperature is so small that the heat evolved is sufficiently absorbed by the surface of the tube so as to prevent the undesirable further decomposition; or (b) By using the heat produced by the reaction of one part of the mixture to bring the temperature of adjacent parts to the reaction point.

The invention also consists in a process as described in the preceding paragraph according to which calcium benzoate or the like is separated from the calcium phthalate or the like which has not undergone the reaction by using the different solubilities of the above salts in boiling water.

The invention also consists in a process according to either of the preceding two paragraphs carried out so that the benzoic acid is obtained from calcium benzoate or the like substantially without loss.

The invention also consists in methods for the production of benzoic acid substantially as hereinafter described.

Figure 2:
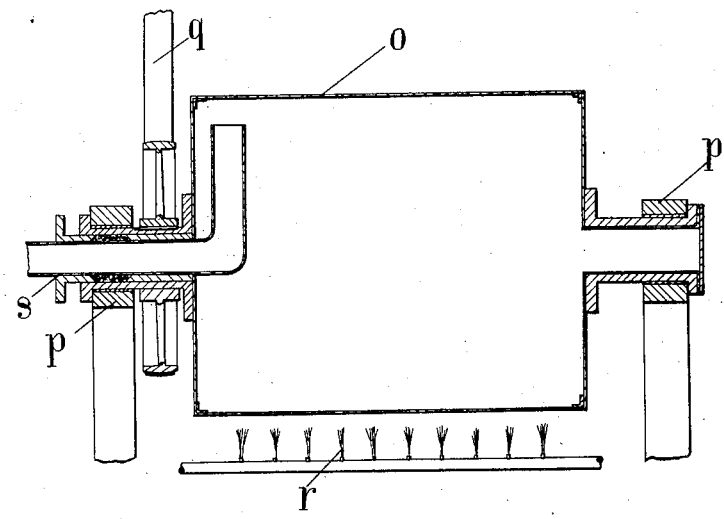

Referring to the accompanying diagrammatic drawings,

Figure 1 illustrates an apparatus for carrying the invention into effect in one way according to the method (a) referred to above, Figure 2 diagrammatically illustrates one form of apparatus for carrying the invention into effect according to the method referred to in paragraph (b) above.

The following examples illustrate how the invention may be carried into effect, all parts being parts by weight:—

*Example 1.*

According to this example the reaction for the production of benzoic acid is carried through continuously by causing a mixture of calcium phthalate and calcium hydroxide to travel through a heated tube, the rate of conveyance and the temperatures along the tube being so adjusted that the mixture reaches a maximum temperature of 450° C. For a tube having an internal diameter of three inches, the rate of conveyance of the mixture is about two inches per minute, and the tube is maintained at a temperature of 440° C. to 450° C. For smoothness of working it is advisable to have a length of the tube not heated so that the reaction mixture can cool from the reaction temperature, before it emerges into the air, since we have found that if the reaction mixture is allowed immediately to get into contact with the air at about 450° C. spontaneous ignition may take place.

In the apparatus shown in Figure 1 the tube $a$ is mounted for the greater part of its length in the bath $b$ but projects beyond the bath to a certain extent at the ends $c$ and $d$. At the end $c$ a feed hopper $e$ communicates with the interior of the tube by way of the aperture $f$. At the end $d$ the tube $a$ communicates with the receiver $g$ by way of the opening $h$. The tube $a$ is heated by means of gas jets $i$ through a suitable alloy or the like $j$ contained in the bath $b$.

Example 2.

According to this example the process of Example 1 is carried out in a helical conveyor.

A suitable helical conveyor is shown in Figure 1, this comprising the helix $k$ mounted on a shaft $l$ driven through gearing $m$ from the driving belt $n$.

With such an apparatus difficulty may be met by the reaction mixture caking into hard masses which clog the mechanism. We have found that this difficulty can be overcome by mixing with calcium phthalate and calcium hydroxide a certain proportion of an inert material which has no influence on the reaction. Such materials are, for example, calcium carbonate, sand, ground granite, or iron in a fine state of division. We prefer to use calcium carbonate because this is obtained as a by-product in the reaction itself.

Example 3.

This may be regarded as a modification of Example 1, in which a slightly lower temperature is used, so as to ensure a small amount of calcium phthalate remaining in the mixture at the end of the reaction. Such a temperature may conveniently be, for example, about 435° C.

According to this example we arrange the conditions of the reaction so that no decomposition of calcium benzoate takes place. We have found that this decomposition is probably due to overheating, and we prefer so to adjust the temperature of the tube that a small proportion of the calcium phthalate is left unacted upon. The presence of this remaining calcium phthalate does not appear to be detrimental to the process as a whole, since we have discovered a method of separating calcium phthalate and calcium benzoate which is described below.

Example 4.

This is an example of the treatment of the mixture after reaction.

The crude mixture which emerges from the converter tube, and consists of calcium benzoate, possibly some calcium phthalate and calcium carbonate (part of which may be produced by the reaction and part of which may be present as an inert diluent material, as described in Example 2) is boiled with sufficient water to dissolve the calcium benzoate (that is, at least 10 times the weight of calcium benzoate present in the mixture). The boiling mass is filtered hot and the residue in the press consists of calcium carbonate and unchanged calcium phthalate. The filtrate is acidified, preferably at the boiling point, with sulphuric acid and the calcium sulphate filtered off. The benzoic acid crystallizes out on cooling and the mother liquors are used for extracting the next batch; by this last step we ensure that the small amount of benzoic acid that remains dissolved in the mother liquor is not lost.

The filterpress residues, consisting of calcium carbonate and any unchanged calcium phthalate that may be present, are treated with phthalic acid or phthalic anhydride so as to convert part of the calcium carbonate into calcium phthalate. It is then mixed with lime and filtered. The press cake is dried and ground and is ready for sending through the converter tube.

Example 5.

According to this example the following substances are used in the proportions stated namely:—

| | Parts. |
|---|---|
| Calcium phthalate | 400 |
| Calcium hydroxide | 74 |
| Calcium carbonate | 480 |

This mixture is sent through the converter as indicated above.

General.

Whilst the main object of the present invention is to deal with the employment of phythalic acid for the production of benzolic acid, the invention is not limited thereto, particularly as regards the apparatus described, and the principles involved in its use, which may, for instance, be applied to the carrying out of chemical reactions between solids generally.

The preparation of calcium benzoate by the method described is regarded as of particular importance.

The principle indicated under the side heading (b) in the preamble to the specification is also of merit, especially in connection with the production of calcium benzoate.

A suitable apparatus in which the heat produced by the reaction of one part of the mixture to bring the temperature of adjacent parts to a reaction point is shown in Figure 2. This apparatus includes the container or drum *o* mounted in bearings *p* and adapted to be driven from the driving belt *q*. The drum is heated by the agency of gas jets *r* and gaseous products passed to the atmosphere from the inside of the drum *o* by way of the fixed pipe *s*. When employing the apparatus shown in Figure 2, the container is rotated while the mixture is being brought to about 420° C. Rotation is then stopped during the initiation and course of the reaction.

We have found that the conversion of fairly large quantities can be carried through if the temperature of the mixture of calcium hydroxide and calcium phthalate is brought up to about 420° C., that is nearly to the temperature at which the reaction proceeds with rapidity, and if then the source of heat is withdrawn from the main mass and a small portion is heated to between 440–450° C. the reaction then starts and will extend throughout the whole mass without attaining a temperature which causes decomposition of the calcium benzoate to any material extent. The reaction mass in this case can be worked and benzoic acid separated from it by the method outlined above. The conversion of the calcium phthalate in bulk can also be carried out in the presence of calcium carbonate or other inert material.

The invention is not limited to the use of calcium salts. The method of conversion and working up may also be carried out with the other alkaline earth salts.

Having now described our invention, what we claim as new and desire to secure by Letters Patent is:—

1. A method which consists in conducting a reacting mixture containing at least one solid constituent through a narrow heated tube, so that the bulk of the mixture, which has arrived at reaction temperature, is so small that the heat evolved is sufficiently absorbed by the surface of the tube so as to prevent undesirable decomposition.

2. A method of bringing about exothermic reactions including organic compounds which comprises conducting a reaction mixture at least one of the components being a solid through a narrow heated tube so that the bulk of the mixture which has arrived at reaction temperature is so small that the heat evolved is sufficiently absorbed by the surface of the tube so as to prevent undesirable decomposition or side reactions.

3. A method of transforming polycarboxylic acid compounds into monocarboxylic acid compounds which comprises conducting a reaction mixture containing the polycarboxylic acid compounds through a narrow heated tube, at least one constituent of the reaction mixture being a solid so that the bulk of the mixture which has arrived at reaction temperature is so small that any heat evolved is sufficiently absorbed by the surface of the tube so as to prevent undesired decomposition or side reactions.

4. A method according to claim 3 in which the reaction mixture contains at least one salt of the polycarboxylic acid compound.

5. A method according to claim 3 in which the reaction mixture contains at least one salt of the polycarboxylic acid compound and at least one alkaline hydroxide.

6. A method of producing a benzoic acid compound which comprises conducting a reaction mixture containing a salt of phthalic acid through a narrow heated tube at least one constituent of the reaction mixture being a solid so that the bulk of the mixture which has arrived at reaction temperature is so small that the heat evolved is sufficiently absorbed by the surface of the tube so as to prevent undesirable decomposition.

7. A method according to claim 6 in which the reaction mixture contains calcium phthalate and calcium hydroxide.

8. A method according to claim 1 in which the reacting mixture contains solid diluents.

9. A method according to claim 2 in which the reacting mixture contains solid diluents.

10. A method according to claim 3 in which the reacting mixture contains solid diluents.

11. A method according to claim 6 in which a solid diluent is present in the reaction mixture.

12. A method according to claim 6 in which the reaction mixture contains an alkaline earth metal phthalate, an alkaline earth metal hydroxide and a solid diluent.

13. A method according to claim 6 in which the reaction mixture contains an alkaline earth metal phthalate, an alkaline earth metal hydroxide and an alkaline earth carbonate.

In testimony whereof we have signed our names to this specification.

DAVID ALEXANDER WHYTE FAIRWEATHER.
ERNEST GEORGE BECKETT.
JOHN THOMAS.